United States Patent [19]

Burkes et al.

[11] Patent Number: 5,445,837
[45] Date of Patent: * Aug. 29, 1995

[54] SWEETENER SUPPLEMENT FORTIFIED WITH A CONCENTRATED BIOAVAILABLE CALCIUM SOURCE AND PROCESS OF MAKING

[75] Inventors: Alice L. Burkes, Cincinnati; Mary M. Fox, Fairfield, both of Ohio

[73] Assignee: The Procter & Gamble Company, Cincinnati, Ohio

[*] Notice: The portion of the term of this patent subsequent to Feb. 14, 2012 has been disclaimed.

[21] Appl. No.: 184,742

[22] Filed: Jan. 21, 1994

Related U.S. Application Data

[63] Continuation of Ser. No. 964,239, Oct. 21, 1992, abandoned.

[51] Int. Cl.$^6$ .............................................. A23L 1/304
[52] U.S. Cl. ................................... 426/74; 426/524; 426/648; 426/654; 426/658
[58] Field of Search ................. 426/74, 524, 648, 654, 426/658

[56] References Cited

U.S. PATENT DOCUMENTS

| | | | |
|---|---|---|---|
| 4,551,342 | 11/1985 | Nakel et al. | 426/548 |
| 4,722,847 | 2/1988 | Heckert | 426/74 |
| 4,737,375 | 4/1988 | Nakel et al. | 426/590 |
| 4,830,862 | 5/1989 | Braun et al. | 426/74 |
| 4,867,977 | 9/1989 | Gailly et al. | 424/687 |
| 4,871,554 | 10/1989 | Kalala et al. | 426/74 |
| 4,919,963 | 4/1990 | Heckert | 426/599 |
| 4,992,282 | 2/1991 | Mehansho et al. | 426/72 |
| 4,994,283 | 2/1991 | Mehansho et al. | 426/74 |
| 5,028,446 | 7/1991 | Saleeb et al. | 426/590 |
| 5,118,513 | 6/1992 | Mehansho et al. | 426/2 |

FOREIGN PATENT DOCUMENTS

| | | | |
|---|---|---|---|
| 0227174 | 1/1987 | European Pat. Off. | A23L 2/02 |
| 0244903 | 11/1987 | European Pat. Off. | A23L 2/38 |
| 0301653 | 2/1989 | European Pat. Off. | A23L 2/26 |
| 304986 | 3/1989 | European Pat. Off. | A61K 31/91 |
| 304987 | 3/1989 | European Pat. Off. | A23L 1/19 |
| 346866 | 12/1989 | European Pat. Off. | A23L 1/304 |
| 0470259 | 2/1991 | European Pat. Off. | A23L 2/00 |
| 56097-248 | 8/1981 | Japan | C07C 51/41 |
| 2207335 | 2/1989 | United Kingdom | A23L 2/00 |
| 8909604 | 10/1989 | WIPO | A61K 33/32 |
| WO91-19692 | 12/1991 | WIPO | C07C 59/265 |

OTHER PUBLICATIONS

Lentner, ed., Geigy Scientific Tables, 8th edition, Ciba Geigy, 1981, pp. 243–245.
Nagy, et al., Citrus Science and Technology, vol. 1, Avi Publishing, pp. 93–100 (1977).
Hartel, R. W., Food Technology, 99–107, Nov., 1993.
Hudepohl et al., "Effects of Sugar Alcohols on Calcium Bioavailability from Fruit Juices", Presentation given Apr. 1990.

(List continued on next page.)

*Primary Examiner*—Helen Pratt
*Attorney, Agent, or Firm*—Rose Ann Dabek; J. C. Rasser

[57] ABSTRACT

A sweetener supplement compositions which provides a bioavailable source of calcium and are stable from calcium salt precipitation for at least about four hours at temperatures of at least about 85° F. (29° C.). The compositions comprise:

a) from about 0.6% to about 7%, by weight, soluble calcium;
b) from about 2% to about 47%, by weight, of an edible acid component comprising a mixture of citric acid and malic acid wherein the ratio of citric equivalents and malic equivalents to calcium equivalents is from about 1.5:1 to about 2:1 and the ratio of citric equivalents to malic equivalents is from about 3:97 to about 93:7;
c) from about 5% to about 80%, on a dry weight basis, sugar, wherein preferably at least about 15% of said sugar is fructose, on a dry weight basis; and
d) from about 5% to about 92%, by weight, water.

The present invention also relates to methods of making said sweetener supplements, foods and beverages containing them and to methods of enhancing the solubility and bioavailability of calcium citrate malate.

26 Claims, No Drawings

OTHER PUBLICATIONS

Mehansho et al., "Calcium Bioavailability and Iron--Calcium Interaction in Orange Juice", J. of the Amer. College of Nutr., 8(1):61–68, 1989.

Holbrook et al., "Dietary Fructose or Starch: Effects on Copper, Zinc, Iron, Manganese, Calcium, and Magnesium Balances in Humans", Am J Clin Nutr. 49:1290–4, 1989.

Riis et al., "Does Calcium Supplementation Prevent Postmenopausal Bone Loss?" N. Eng. J. of Med. 316(4):174–177, Jan. 22, 1987.

Nilas et al., "Calcium Supplementation and Postmenopausal Bone Loss", Brit. Med. J. 289:1103–6, Oct. 27, 1984.

Johnston Jr. et al., "Calcium Supplementation and Increase in Bone Mineral Density in Children", N. Eng. J. Med., 327:82–87, Jul. 9, 1992.

Dawson-Hughes et al., "A Controled Trial of the Effect of Calcium Supplementation in Bone Density in Postmenopausal Women", N. Eng. J. Med. 323(13):878–881, Sep. 27, 1990.

Bishop, "Calcium Slows Bone Loss for Woemn Past Menopause, Experiment Shows", Wall Street Journal, Sep. 27, 1990.

Unknown, "Calcium Prevents Bone Loss in Postmenopausal Women", Tufts University Press Release Boston, Mass., Sep. 1990).

SWEETENER SUPPLEMENT FORTIFIED WITH A CONCENTRATED BIOAVAILABLE CALCIUM SOURCE AND PROCESS OF MAKING

This is a continuation of application Ser. No. 07/964,239, filed on Oct. 21, 1992 now abandoned.

TECHNICAL FIELD

The present invention relates to sweetener supplements which are nutritionally supplemented with significant levels of concentrated calcium citrate malate and to methods for making said supplements. The supplements are for use in foods, beverages and pharmaceuticals.

BACKGROUND OF THE INVENTION

When a member of the general public is asked to define "sugar", a typical given description is "a sweet tasting granular substance". In the nutritional art "sugar" typically refers to a carbohydrate such as glucose, sucrose, maltose, fructose, sugar alcohols, low molecular weight dextrins and related carbohydrates. In the art, the broader term "sweeteners" includes both sugar and artificial sweeteners such as Aspartame ®, saccharin, and the like.

Fructose is the sweetest of the common sugars and is commonly used in foods and beverages in such forms as high fructose corn syrup or invert syrup. Due to its high hygroscopicity, powdered or crystalline fructose is very expensive and hard to make. Crystalline fructose is very hygroscopic and will begin to absorb moisture at 60% relative humidity. To prevent water absorption and to avoid difficulties in processing and packaging, crystalline fructose's recommended storage conditions are 77° F. (25° C.) or lower, and 50% or less relative humidity. Due to hygroscopicity and storage requirements of crystalline fructose, fructose in the form of syrups comprising about 77% solids and 23% water, wherein 42% to 99% of the solids are fructose, are used in making many food and beverage products. Liquid sweeteners such as Domino's liquid brown sugar, Karo light corn syrup, and Pillsbury Sweet 10 are often purchased by the consumer because of their ease of usage and dissolvability. Manufacturers of food and beverage products purchase large quantities of liquid sweeteners such as high fructose corn syrup, NETO ®, and liquid sucrose to reduce preparation time.

Sugars, particularly fructose syrups, can be used in a multitude of products such as carbonated beverages, coatings for baked goods such as cakes and pies, confectionary products such as mints, and over-the-counter pharmaceuticals such as cough syrups. However popular these products are with the general population, the nutritional benefits in terms of vitamins and minerals obtained from such products is often quite low.

Vitamin and mineral supplements for human and veterinary use are commonplace. Some diets, heavy physical exercise and disease conditions can require the intake of considerable quantities of minerals and vitamins apart from those generally obtained from what otherwise would be considered a normal diet. Vitamin and mineral supplementation is important primarily for those who have inadequate diets, including growing children. Older adults have an additional need for calcium to help prevent age-related bone loss. Postmenopausal women need additional calcium due to hormonal changes which can accelerate the rate of bone loss leading to a further diminishment in bone mass. Therefore, supplementation of the diet with a highly bioavailable source of calcium is desirable.

Calcium can be obtained from a variety of dietary sources. Primary sources of calcium are dairy products, in particular milk, which account for 75% of the daily calcium intake while foods other than dairy products generally contribute less than 200 mg of calcium daily. However, beginning in young adulthood and continuing through later life, the general population may not consume milk in sufficient quantities to obtain the recommended dietary levels of calcium. This diminished consumption can be caused by lactose intolerance as well as by the unattractiveness of milk as a drink for social occasions.

One of the problems in calcium supplementation is that all calcium sources are not equally soluble or bioavailable. Calcium citrate is poorly soluble in water; 1 gram of calcium citrate dissolves in 1,050 grams of cold water. Calcium malate exhibits a slightly greater solubility. Calcium hydroxide is only slightly soluble in water, and it absorbs carbon dioxide from the air to readily form calcium carbonate.

It is essential for the bioavailablity of calcium that the calcium salts be soluble in the stomach and intestine. This solubility aids in making calcium more readily available for absorption. Thus, the choice of calcium salts depends upon the interaction of the salts with secretions in the stomach and intestine.

Chewable tablets are a popular form of calcium supplements. However, they leave a gritty mouthfeel and a chalky aftertaste which many find unpleasant. The utility of these known supplements varies. Unlike agents, such as estrogen, which affect the metabolism of bone, calcium nutritional supplements have been thought to merely provide another source of the nutrient which may or may not be properly absorbed and metabolized.

Concentrated liquid bioavailable calcium supplements are unknown in the art. Several beverages containing calcium are known however, they provide milk level calcium ($\frac{1}{3}$ RDA) in 6 to 8 oz. of beverage; often show signs of solids settling, and are available in limited flavors (usually citrus).

Calcium citrate malate (CCM) is a highly bioavailable source of calcium. Calcium citrate malate may be obtained as a powder or can be formed in situ. Currently, calcium citrate malate can be obtained in certain commercially available juice beverages which provide milk level calcium in a good tasting product.

A need exists to provide a means of fortifying a variety of normally consumed food and beverage products. A sweetener supplement fortified with a concentrated bioavailable calcium source. Calcium citrate malate can provide a means to fortify food and beverages in a liquid form and carrier, which is commonly used as a normal ingredient in the preparation of food and beverage products. Such a sweetener supplement would need to be in a pourable/pumpable solution for maximum ease in usage. Formulating a pourable/pumpable solution with concentrated calcium citrate malate causes difficulties in solubilizing the solid ingredients such as the acids, sugar and calcium source. As more calcium is added, more acid is added and there is less liquid to dissolve the solids. This means that the components used to form CCM account for larger and larger proportions of the solids and generally from about 5% to 65% by weight of the compositions of the present invention.

Formulating a pourable/pumpable solution with a minimum amount of water causes difficulties in solubilizing the solid ingredients such as the acids, sugar and calcium. Due to the level of calcium citrate malate necessary to achieve a nutritionally significant level of calcium in the sweetener supplement, the precipitation of calcium, particularly at high temperatures, is a problem. Stability from calcium precipitation at high temperatures, greater than 85° F. (29° C.), is particularly important for storage in warehouses, plants and retail establishments without climate control and for storage near heat sources such as those found in commercial kitchens. Another stability concern at high solids concentrations levels is the crystallization of sugars, particularly sucrose.

A further concern in formulating such sweetener supplements is maintaining a desirable taste. The inclusion of high levels of calcium from common calcium sources such as calcium hydroxide can impart significant "chalky" or "biting/burning" mouthfeel sensations. In addition, the inclusion of chloride can impart a bitter and/or salty/brackish note to the flavor. These additives must be balanced. It would therefore be preferred to formulate concentrated sweetener supplements that when diluted and used in beverages, foods or pharmaceuticals, an acceptable taste is achieved.

The object of the present invention is to prepare sweetener supplements which are nutritionally supplemented with concentrated calcium citrate malate; are bioavailable; are clear solutions visually undistinguishable from commonly used liquid sweeteners; provide stability from calcium salt precipitation for at least about 4 hours, preferably at least about 3 days, at temperatures of at least about 85° F. (29° C.); and when used in beverages and foods can provide an acceptable taste. A further object is stability from sugar crystallization at high temperatures for at least about 4 hours, preferably at least about 3 days and most preferably at least about five days at temperatures of at least about 85° F. (29° C.). Another object of the invention is to provide a soluble bioavailable calcium source which can be readily used as a food ingredient and a method of enhancing said bioavailability.

DEFINITIONS

As used herein the term, "calcium citrate malate" or "CCM" refers to a mixture or complex of calcium, citrate and malate.

As used herein, the term "malic acid" refers to the mixture of the D and the L isomers, i.e., malic acid is optically active and the racemic mixture is used herein. D-malic acid and L-malic acid can be used separately or mixed.

As used herein, "water" includes the total amount of water present in the composition. "Water" includes water from flavors, juice concentrates, sugar syrups and other sources, e.g., gum solutions. Water of hydration of calcium and other solids is also included.

As used herein, "solids" are primarily the dissolved sugars, salts, gums, acids and soluble calcium. "Fructose solids" refers to the dissolved fructose. Typically, solids are measured by the refractive index and are called °Brix. °Brix approximates the dissolved solids content of the concentrate.

As used herein, "comprising" means various components can be conjointly employed in the sweetener supplement compositions of the present invention. Accordingly, the terms "consisting essentially of" and "consisting of" are embodied in the term "comprising".

By "nutritional" or "nutritionally-supplemental amount" herein is meant that the amount used in the practice of this invention provides a nourishing amount of calcium at typical daily ingestion levels of the final product. This is supplemental or in addition to the calcium normally present in the diet. Typically the supplemental amount will comprise from about 10% to about 300% of the Recommended Dietary Allowance (RDA) of calcium. Preferably, at least 30% of the Recommended Dietary Allowance (RDA) will be provided. The RDA is as defined in the United States of America (see Recommended Daily Dietary Allowance-Food and Nutrition Board, National Academy of Sciences-National Research Council).

Specific compounds and ,compositions to be used in the processes herein must be food approved or pharmaceutically acceptable. The compositions must be edible and approved for human and/or animal consumption. As used herein, a "pharmaceutically acceptable" component is one that is suitable for use with humans and/or animals without undue adverse side effects (such as toxicity, irritation and allergic response) commensurate with a reasonable benefit/risk ratio when used in the manner of this invention the specific "safe and effective amount" will, obviously, vary with such factors as the physical condition of the consumer, the age of the consumer, the nature of concurrent drug therapy (if any) and the specific formulations employed.

As used herein, the term "single strength beverage(s)" refers to a beverage composition in a ready-to-serve, drinkable form. It will usually be less than 15° Brix.

"Sugar(s)", as used herein, means a carbohydrate sweetener. Preferably, they are mono and disaccharides such as glucose, sucrose, maltose, fructose, sugar alcohols, low molecular weight dextrins and related carbohydrates. The term "sugar(s)" includes both liquid syrups and crystalline or solid sugars. "Sugar(s)" also includes liquid fructose, high fructose corn syrup solids, invert sugar, maltose syrup and sugar alcohols, including sorbitol and mixtures thereof. Artificial or high intensity sweeteners are not encompassed by the term sugar(s).

SUMMARY OF THE INVENTION

Stability from calcium precipitation and sugar crystallization over time and at high temperatures allows the compositions of the present invention to be stored for periods of time without refrigeration, dilution or freezing. Sweetener supplement compositions of the present invention comprise:
  a) from about 0.6% to about 7%, by weight, soluble calcium;
  b) from about 2% to about 47%, by weight, of an edible acid component comprising a mixture of citric acid and malic acid wherein the ratio of citric equivalents and malic equivalents to calcium equivalents is from about 1.5:1 to about 2:1, preferably from 1.5:1 to about 1.8:1, and the ratio of citric equivalents to malic equivalents is from about 3:97 to about 93:7, preferably from about 10:90 to about 50:50 and more preferably about 20:80;
  c) from about 5% to about 80%, preferably from about 5% to about 75% and more preferably from about 25% to about 55%, on a dry weight basis, sugar, wherein preferably at least about 15% of said sugar is fructose (on a dry weight basis) and the weight ratio of water to fructose (on a dry weight basis) is preferably from about 5:1 to about 1:3, more preferably from about 2:1 to about 1:2 and most preferably about 1: 1 to about 1: 2; and d) from about 5% to about 92% preferably from about 20% to about 70% and more preferably from about 23% to about 60%, by weight, water.

These compositions are stable from calcium precipitation for at least about four (4) hours to at least about 3 days at temperatures of at least about 85° F. (29° C.).

Particularly, the present invention relates to sweetener supplement compositions which are stable from calcium precipitation and sugar crystallization for at least about three (3) days at temperatures of at least about 85° F. (29° C.) comprising:

a) from about 0.6% to about 2.5%, preferably from about 1.2% to about 2.4%, by weight, soluble calcium;

b) from about 2% to about 17%, preferably from about 4% to about 14%, by weight, of an edible acid component comprising a mixture of citric acid and malic acid wherein the ratio of citric equivalents and malic equivalents to calcium equivalents is from about 1.5:1 to about 2:1, preferably from 1.5:1 to about 1.8:1, and the ratio of citric equivalents to malic equivalents is from about 3:97 to about 93:7, preferably from about 10:90 to about 50:50 and more preferably about 20:80;

c) from about 5% to about 75% preferably from about 35% to about 70% and more preferably from about 35% to about 45%, on a dry weight basis, sugar wherein said sugar comprises at least about 5%, preferably at least about 15% and more preferably at least about 40%, fructose, on a dry weight basis; and d) from about 5% to about 92%, preferably from about 11% to about 70% and more preferably from about 30% to about 60%, by weight, water.

These compositions are stable from calcium precipitation and sugar crystallization for at least about four (4) hours at temperatures of at least about 85° F. (29° C.) and typically from about 3 days to about 130 days, preferably from about 45 days to about 100 days, at temperatures of at least about 85° F. (29° C.). From about 3% to about 30% of the soluble calcium can be sourced from an acidic calcium salt. The compositions preferably can further comprise from about 0.05% to about 5%, preferably from about 0.2% to about 3%, of an acidic anion which typically improves stability by a factor of two. Another means of improving stability to at least about seven (7) days is for preferably at least about 15% and more preferably at least about 40% of the sugar to be fructose such that the weight ratio of water to fructose (on a dry weight basis) is from about 5:1 to about 1:3, preferably from about 2:1 to about 1:2 and most preferably from about 1: 1 to about 1:2.

Further, the present invention relates to sweetener supplement compositions which are stable from calcium precipitation and sugar crystallization for at least about 3 days, at temperatures of at least about 85° F. (29° C.) comprising:

a) from about 2.5% to about 7%, preferably from about 2.5% to about 5%, by weight, soluble calcium;

b) from about 10% to about 47%, preferably from about 15% to about 40%, by weight, of an edible acid component comprising a mixture of citric acid and malic acid wherein the ratio of citric equivalents and malic equivalents to calcium equivalents is from about 1.5:1 to about 2:1, preferably from 1.5:1 to about 1.8:1, and the ratio of citric equivalents to malic equivalents is from about 3:97 to about 93:7, preferably from about 10:90 to about 50:50 and more preferably about 20:80;

c) from about 10% to about 70%, preferably from about 25% to about 60% and more preferably from 30% to about 50%, on a dry weight basis, sugar wherein said sugar comprises at least about 15%, preferably at least about 40%, fructose, on a dry weight basis; and d) from about 20% to about 60%, preferably from about 25% to about 60%, by weight, water wherein the weight ratio of water to fructose (on a dry weight basis) ranges from about 5:1 to about 1:2, preferably from about 2:1 to about 1:2 and most preferably from about 1:1 to about 1:2.

These compositions are stable from calcium precipitation and sugar crystallization for at least about four (4) hours at temperatures of at least about 85° F. (29° C.) and typically from about 3 days to about 130 days, preferably from about 45 days to about 100 days, at temperatures of at least about 85° F. (29° C.). Preferably, these compositions are stable for at least about five (5) days at about 85° F. (29° C.).

From about 3% to about 30% of the soluble calcium can be sourced from an acidic calcium salt. The compositions preferably can further comprise from about 0.05% to about 5%, preferably from about 0.2% to about 4%, of an acidic anion which typically improves stability by a factor of two.

The present invention also relates to methods of making said sweetener supplement compositions and foods and beverages containing them and to methods of enhancing the bioavailability of said compositions.

All percentages and ratios herein are on a weight basis unless otherwise specified.

DETAILED DESCRIPTION

Sugars

Sugars are expressed on a dry weight basis. For example, one hundred grams of a high fructose corn syrup having 77% solids of which 42% may be fructose solids, (the remainder of the solids being glucose and minors) and 23% water would provide seventy-seven grams of solids and twenty-three grams of water.

The level of sugar, on a dry weight basis, used in the present invention ranges from about 5% to about 80%, preferably from about 5% to about 75% and most preferably from about 25% to about 55%. For compositions having a level of from about 0.6% to about 2.5% soluble calcium, at least about 5%, preferably at least about 15% and more preferably at least about 40%, of the sugar is fructose. For compositions having a level of from about 2.4% to about 7% soluble calcium, at least about 15% of the level of sugar is fructose. Preferably at least about 40% and most preferably at least 95% of the level of sugar is fructose for all the compositions of the present invention. In addition to fructose, preferred sugars for use in the present invention are glucose (dextrose), maltose, sucrose, invert sugar and mixtures thereof.

Most preferred for use in all the present compositions is a combination of sugars comprising from about 15% to about 99%, preferably from about 42% to about 99% fructose, since it has been discovered that having at least a minimal portion of fructose aids the inhibition of calcium precipitation and/or sucrose crystallization over time and at high temperatures. Although sucrose can be used as 100% of the sugar, it is not preferred since some crystallization can occur and sucrose has not been shown to greatly aid bioavailability. Using a portion of fructose, preferably at least 5% of the total sugars for compositions comprising from about 0.6% to about 2.5% soluble calcium and at least about 15% of the total sugars for compositions comprising from about 2.5% to about 7% soluble calcium, inhibits sucrose crystallization and provides a stability benefit against calcium precipitation.

Generally, fructose is used in the form of liquid fructose, high fructose corn syrup, dry crystalline/solid fructose, fructose syrup and mixtures thereof. The high fructose corn syrups useful in the present invention comprise from about 71% to about 77% solids and from about 23% to about 29% water wherein from about 42% to about 90% of the solids are fructose solids. A high fructose corn syrup referred to as "liquid fructose" is the most preferred source of fructose. Liquid fructose has about 77% solids and about 23% water wherein the solids are from about 95% to about 100% fructose solids.

Preferred sources of fructose are: High Fructose Corn Syrup 42 (HFCS 42) comprising about 71% solids (about 42% being fructose, about 28% being dextrose and about 1% being maltose) and about 29% water and supplied by A. E. Staley; High Fructose Corn Syrup 55 (HFCS 55) comprising about 77% solids (about 55% fructose, 22% dextrose and minors) and about 23% water and supplied by A. E. Staley; and Liquid Fructose comprising about 77% solids (about 99% fructose and the remainder minors) and 23% water and supplied by A. E. Staley.

It should be noted that sugars, especially mixtures containing fructose, have been unexpectedly found to enhance the absorbability/bioavailability of calcium.

Calcium

In general, the Recommended Dietary Allowance (RDA) for calcium will range from about 400 mg per 6 kg for infants up to about 1200 mg for females and males, age 11 to 24. 1200 mg is the recommended RDA for lactating women. One fluid ounce of the sweetener supplement compositions of the present invention typically can supply from about 10% to about 300% RDA for any given individual.

The sweetener supplement compositions of the present invention comprise a mixture of calcium; the acid anions, citrate and malate; and sugar. Calcium citrate malate (CCM) is a bioavailable source of calcium comprising a mixture of calcium salts, citric acid and malic acid. CCM is formed in situ in the liquid medium (added water and/or sugar syrups) by the reaction of a calcium salt or mixtures thereof and the edible acid component.

To be useful in the present invention, the calcium must be "solubilized", i.e., dissolved, in the liquid medium. Accordingly, the amount of calcium included in the sweetener supplement compositions of the present invention will be referred to in terms of "solubilized calcium", i.e., the amount of calcium ion dissolved.

Suitable sources of calcium include calcium carbonate, calcium oxide, calcium hydroxide, calcium sulfate, calcium chloride, tricalcium phosphate, calcium hydrogen phosphate and calcium dihydrogen phosphate, as well as the respective organic salts of calcium, e.g., calcium citrate, calcium malate, and calcium tartrate.

It has been discovered that from about 3% to about 30% of the soluble calcium can be provided by an acidic calcium salt such as calcium chloride, calcium sulfate, calcium nitrate, calcium acetate, and mixtures thereof. Although not an acidic calcium salt, calcium lactate can be used to provide from about 3% to about 30% of the soluble calcium and it provides an effect similar to that produced by using an acidic calcium salt. Preferably, from about 10% to about 20% of the soluble calcium is sourced from an acidic calcium salt and/or calcium lactate. Preferred acidic calcium salts for use herein are calcium chloride, calcium nitrate, calcium sulfate and mixtures thereof.

Mixtures of calcium carbonate and calcium hydroxide, which optionally include calcium chloride, calcium sulfate and calcium nitrate, are useful and, often preferred for use in the sweetener compositions of the present invention. The most preferred calcium sources are calcium carbonate, calcium hydroxide and mixtures thereof, since these calcium salts are neutralized by the organic acids, forming carbon dioxide and/or water.

For compositions comprising from about 2.4% to about 7% soluble calcium, calcium hydroxide is not preferred for use as the sole calcium source.

The sweetener supplement compositions of the present invention comprise from about 0.6% to about 7% solubilized calcium. Preferably, the sweetener compositions comprise from about 1% to about 5% and most preferably from about 1% to about 4% solubilized calcium.

Edible Acid Component

A key component for the sweetener supplement compositions of the present invention from the standpoint of stability against precipitation of insoluble calcium salts is the edible acid component. The edible acid component comprises a mixture of citric acid and malic acid wherein the ratio of citric equivalents and malic equivalents to calcium equivalents is from about 1.5:1 to about 2:1, preferably from 1.5:1 to about 1.8:1, and the ratio of citric equivalents to malic equivalents is from about 3:97 to about 93:7, preferably from about 10:90 to about 50:50 and more preferably about 20:80. These acids can be present as acids or else as their respective anionic salts, i.e., citrate and malate.

It is important to this invention that the calcium source be completely neutralized by the citric and malic acids and that the equivalents from the acids be in excess of the equivalents from the calcium source. The product herein must have an excess of citric and malic equivalents. Preferably, there is at least 50% and more preferably at least 80% more acid equivalents from citric and malic acid than calcium. This can be defined by the following equation: $Cit + Mal = x \, (Ca)$ where: $x =$ from about 1.5 to about 2.0, preferably from about 1.5 to about 1.8; $Cit =$ equivalents of citric acid; $Mal =$ equivalents of malic acid; and $Ca =$ equivalents of calcium. In general, it has been found that a weight ratio of acid to calcium of from about 4:1 to about 7:1, preferably from about 5.5:1 to about 6.5:1 accomplishes this result.

For the purposes of the present invention, the level of the edible acid component (hereafter total acids) depends on the sweetener composition involved, the level of calcium included (as previously discussed), as well as the taste and stability properties desired.

For the sweetener supplement compositions of the present invention, the level of the edible acid component can range from about 2% to about 47%, and preferably from about 4% to about 35%. The most preferred level of total acids is from about 5% to about 30%.

Water

The sweetener supplement compositions comprise from about 5% to about 92%, preferably from about 20% to about 70% and most preferably from about 23% to about 60%, by weight, water. The amount of water present will determine the concentration of the sweetener supplement compositions.

The preferred weight ratio of water to fructose (on a dry weight basis) for the sweetener supplement compositions is from about 5:1 to about 1:3. The more preferred weight ratio of water to fructose is from about 2:1 to about 1:2 and the most preferred weight ratio of water to fructose (on a dry weight basis) is from about 1:1 to about 1:2.

For sweetener supplement compositions comprising from about 2.5% to about 7%, preferably from about 2.5% to about 5%, soluble calcium, the weight ratio of water to fructose (on a dry weight basis) is from about 5:1 to about 1:2, preferably from about 2:1 to about 1:2 and more preferably from about 1:1 to about 1:2.

The weight ratio of water to total solids for the compositions of the present invention ranges from about 10:1 to about 1:3, preferably from about 1:1 to about 1:3.

The weight ratio of water to calcium to typically from about 153:1 to about 1.4:1. For compositions comprising from about 0.6% to about 7.4% solubilized calcium, the weight ratio of water to calcium is from about 153:1 to about 2:1, preferably from about 58:1 to about 5:1 and more preferably from about 50:1 to about 12:1. For compositions comprising from about 2.4% to about 7% solubilized calcium, the weight ratio of water to calcium is from about 25:1 to about 3:1 and preferably from about 24:1 to about 5:1.

pH

The sweetener supplement compositions have a pH of less than or equal to about 3.8. Preferably, the pH is less than or equal to about 3.4 and more preferably less than or equal to about 3.2. Typically, the pH will range from about 2.5 to about 3.8. The pH is measured on the sweetener supplement as is without dilution.

OPTIONAL COMPONENTS

The sweetener supplement compositions of the present invention may comprise any other ingredient or ingredients typically used as optional ingredients. Other minor ingredients are frequently included. Such ingredients include preservatives such as benzoic acid and salts thereof, sulfur dioxide, etc. Preferably, preservatives are added to the concentrated sweetener supplements as long as the pH is above about 3.3 and the solids content is less than about 42%. Colors derived either from natural sources or synthetically prepared can be used.

Gums, emulsifiers and oils can be included to change the texture and opacity of the sweetener supplement. Typical ingredients include guar gum, xanthan, alginates, mono and diglycerides, lecithin, pectin, pulp, cottonseed oil, vegetable oil and weighting oils. Esters and other flavor and essence oils can also be used.

If optional components, such as a flavor component, are used, the additional water, citric acid, malic acid and/or sugars must be accounted for in the formulation of the sweetener supplements of the present invention.

Acidic Anion Component: Chloride, Nitrate and Sulfate

An optional component for the sweetener supplement compositions of the present invention is the level of organic acidic anions present, such as chloride anion, nitrate anion, sulfate anion, acetate anion and mixtures thereof. The sweetener supplement compositions of the present invention can comprise from about 0.05% to about 5% of an acidic anion, preferably chloride anion, nitrate anion, sulfate anion and mixtures thereof. The acidic anion typically provides an improvement in stability by a factor of two. It has been discovered that from about 0.05% to about 5% of lactate anion can also be used and it provides an Effect similar to acidic anions. The lactate anion can be obtained from its corresponding acid form or preferably from its corresponding calcium salt. When utilizing lactate anion and acetate anion, mixtures of anions are preferred since the lactate and/or acetate anions can introduce off-flavors.

Preferably, the level of acidic anion is in the range of from about 0.05% to about 5%. More preferably, the level is from about 0.2% to about 3%. These ranges are based on the weight of the anion and not on the salt. That is, the weight of the cation is ignored.

The chloride, nitrate and sulfate anions are preferably obtained from their corresponding acid forms, i.e., hydrochloric acid and nitric acid, or from their corresponding calcium salts such as calcium chloride, calcium nitrate, or calcium sulfate.

Preferably the acidic anion is obtained by sourcing from about 3% to about 30% of the soluble calcium from an acidic calcium salt such as calcium chloride, calcium nitrate, calcium sulfate, calcium acetate, and mixtures thereof. Although not an acidic calcium salt, calcium lactate can be used to provide from about 3% to about 30% of the soluble calcium and it provides an effect similar to that produced by using an acidic calcium salt. Preferred acidic calcium salts used are calcium chloride, calcium nitrate, calcium sulfate and mixtures thereof.

Calcium chloride, calcium nitrate, calcium sulfate and mixtures thereof can supply from about 3% to about 30% of the solubilized calcium. Preferably, calcium chloride, calcium nitrate, calcium sulfate and mixtures thereof supply from about 10% to about 20% of the solubilized calcium present. Preferably, the remaining soluble calcium comes from calcium carbonate, calcium hydroxide and mixtures, thereof. These sources have the advantage of being neutralized by the acids.

The most preferred acidic anion for use is chloride anion. Preferably, the chloride anion is derived from calcium chloride, which can provide from about 3% to about 30% solubilized calcium. More preferably, calcium chloride provides from about 10% to about 20% solubilized calcium. Due to the lower solubility level of sulfate, mixtures of sulfate anions with other suitable anions are preferred.

The use of chloride, nitrate, sulfate, acetate and lactate anions in the sweetener supplement compositions of the present invention contributes to the stability at high temperatures when using high levels of solubilized calcium, e.g., milk level and above.

Flavor Component

The particular amount of the flavor component effective for imparting flavor characteristics to the sweetener supplement compositions can depend upon the flavor(s) selected, the flavor impression desired and the form of the flavor component. The flavor component of the present invention is preferably selected from the group consisting of fruit flavors and botanical flavors.

The term "fruit flavor(s)" refers to those flavors derived from the edible reproductive part of a seed plant, especially one having a sweet pulp associated with the seed. Also included within the term "fruit flavor" are synthetically prepared flavors made to simulate fruit flavors derived from natural sources. The citrus flavors including orange flavors, lemon flavors, lime flavors and grapefruit flavors can be used. Besides citrus flavors, a variety of other fruit flavors can be used such as apple flavors, grape flavors, cherry flavors, pineapple flavors and the like. Preferred fruit flavors are apple, grape, cherry and the like as well as mixtures thereof. These fruit flavors can be derived from natural sources such as fruit juices and flavor oils, or else synthetically prepared.

The term "botanical flavor(s)" refers to flavors derived from parts of a plant other than the fruit; i.e., derived from beans, nuts, bark, roots and leaves. Examples of botanical flavors include cocoa, chocolate, vanilla, coffee, cola, tea and the like. Botanical flavors can be derived from natural sources such as essential oils and extracts, or can be synthetically prepared to simulate botanical flavors derived from natural sources.

Fruit and botanical concentrates and purees can be used. Fruit and botanical juices are not preferred for use as flavoring agents. However, if juice is used the amount of juice used as the flavorant depends on its concentration and is easily determined by one skilled in the art.

The water in any flavoring agent used is to be included in the total water percentages of the sweetener compositions. Sugars are to be accounted for in the sugar level.

Uses

Food compositions of the present invention can contain from about 0.1% to about 99% of the sweetener supplement compositions. Preferred embodiments of these food compositions include baked goods, fruit drinks/mixes, frozen foods, candies, carbonated beverages, milk drinks/mixes, gelatins, puddings, fillings, breakfast cereals, breakfast bars, sauces, jams, jellies, whipped toppings, tablets, syrups, orally administered medicines, spreads, chewing gums, candies and chocolates. The preferred food compositions are confectionary products such as candy bars, Fruit Roll-ups ®, gums, candies, baked goods and beverages.

The sweetener supplement compositions of the present invention can be substituted for part of the sugars in a food composition depending on the amount of calcium needed and/or the concentration. Just as adjustments are made in recipes and formulations for the different properties of sucrose and fructose or dextrose, adjustments for the different properties of the sweetener compositions must be made. These changes can be made by one skilled of one in the art.

The following is by way of example a partial list of food compositions which can be made with these sugar derivatives: cakes, cookies, brownies, other sweet snacks, icings, frostings, pie fillings, puddings, frosted cereals, coated nuts (Honey roasted nuts), creams, hard and soft candies, chocolates, cracker, snacks made from potatoes, corn, wheat and other grains, sauces, gravies, yogurt, ice cream, jellies, jams, breadings, breads, rolls, muffins, doughnuts and sweet rolls.

Corn breakfast cereals can be prepared by coating the corn kernels before processing, cooking the corn kernels in the sweetener supplements, and coating the corn kernels after they are flaked and toasted preferably by spraying on the sweetener supplement. The preferred method is by low moisture cooking the corn kernels in the sweetener supplement composition.

Dry Powder Form

Drying the sweetener supplement compositions does not adversely affect the CCM and produces a dry powder form of the sweetener which can be used in any of the conventional uses for granular sugars. The sweeteners can be dried using conventional methods such as freeze drying, spray-drying, oven/drum drying and foam drying in order to produce a dried powder form from a water media. Freeze drying, spray and foam drying are preferred methods of drying because the powders produced have been found to be easily rehydratable, and these methods use rapid and/or low temperature drying which reduces the chances of product degradation and caramelization/browning of sugar.

Surprisingly, it has been discovered that drying CCM in the presence of sugar, preferably fructose, increases the solubility of the CCM powder formed. CCM powders which do not contain sugars are generally 82–88% soluble based on 100 mg calcium/50 mls of water. It is difficult to achieve a CCM dry powder form which is above 90% soluble. The CCM-fortified sweeteners of the present invention, which are dried out of an aqueous solution in the presence of sugar, preferably comprising fructose and more preferably at least about 15%, preferably at least about 15% and more preferably at least about 40%, of the sugar comprising fructose, are generally 93–100% soluble based on 100 mg calcium/50 ml water. These dry powder form CCM-fortified sweeteners preferably have a pH (measured as a 10% wt/wt solution in water) of about 3.7.

The invention thus provides a method of enhancing the solubility of calcium citrate malate comprising the steps of:
a) preparing a sweetener supplement composition of the present invention comprising;
  1) from about 0.6% to about 7%, by weight, soluble calcium;
  2) from about 2% to about 47%, by weight, of an edible acid component comprising a mixture of citric and malic acid wherein the ratio of citric equivalents and malic equivalents to calcium equivalents is from about 1.5:1 to about 2:1, preferably from about 1.5:1 to about 1.8:1, and the ratio of to citric equivalents to malic equivalents is from about 3:97 to about 93:7, preferably from about 10:90 to about 50:50 and more preferably about 20: 80;
  3) from about 5% to about 80%, on a dry weight basis, sugar, wherein preferably at least about 5%, more preferably at least about 15%, of said sugar is fructose on a dry weight basis; and
  4) from about 5% to about 92%, preferably from about 20% to about 70% and more preferably from about 23% to about 60%, by weight, water, wherein the weight ratio of water to fructose (on a dry weight basis) is preferably from about 5:1 to about 1:3, more preferably from about 2:1 to about 1:2 and most preferably from about 1:1 to about 1:2;

freeze drying the sweetener supplement composition at a temperature below about 176° F. (80° C.) until a dry powder is obtained. For freeze drying, the sweetener supplement is preferably frozen in slabs, prior to freeze drying, having a thickness of from about 0.5 cm to 1.1 cm and more preferably from 0.8 cm to about 1 cm.

The dry powder form of the sweetener supplement compositions can be added to ready to serve drinks as a means of fortification. An additional advantage of the dry powder form is that it can be added to food products where liquid sweeteners containing even low levels of water would not be applicable. Examples of these products are powdered beverage mixes, candies, cereal coating, and dry desert mixes. The powder can also be used as a partial replacement for dry sugar in recipes thus fortifying the food product with calcium.

The level of use for the dry powder form will of course vary according to the amount of calcium desired in the end product. The bioavailability of the calcium may be affected by the temperature at which the product is prepared, the solids content of the food, the interaction of other ingredients in the formulation, the pH of the food, and other factors. However, the determination of the level to use is well within the capabilities of one skilled in the art.

Method of Preparation

The calcium salts react with the organic acids so the calcium is solubilized in the processing step. While not wishing to be bound by theory, it is believed that a metastable calcium citrate malate complex is formed. The calcium salts, e.g., calcium carbonate, along with the citric and malic acids remain in solution in the sweetener supplement compositions. When processed in the manner described herein, the calcium citrate malate is more soluble than the corresponding salts, i.e. calcium citrate and calcium malate.

In order to achieve the maximum stability benefit, the materials should be added in a particular sequence. When sugars and calcium salts are solubilized, they compete for water to remain in solution. To make a concentrated solution which is free from precipitates, all solids should be dissolved or slurried in liquid media, preferably in water or liquid fructose, either as a premix or during the addition step.

Several premixes or solutions are formed. The sugars are dissolved in water if a crystalline or solid form of sugar is being used. For ease of preparation, liquid sugars or syrups are most preferred for use. Preferred sugar sources are liquid fructose, invert syrup and high fructose corn syrup.

The citric and malic acids are also dissolved in water. Once the acids are dissolved, the acidic anion source or acidic calcium salts if utilized, e.g., calcium chloride, is then added with agitation until dissolved into the solution containing the citric and malic acids. The addition of an acidic anion source, e.g., calcium chloride, has two advantages, one being the pH of the solution is reduced making calcium solubility more favorable and the other being that greater stability from calcium salt precipitation at high temperatures is obtained. If used the preservatives and optional ingredients, i.e. thickeners, gums, alginates, pectins, emulsifiers are dissolved or slurried in liquid media to form a premix.

The sugar is then added to the acids in solution.

It is desirable that the calcium source be prepared as a slurry, however, it is not necessary. Thus the calcium source(s), e.g., calcium carbonate, is dispersed in water, liquid fructose, high fructose corn syrup or other sugar syrup. (Calcium hydroxide, as the single calcium source, is not preferred for use in only liquid fructose or high fructose corn syrups slurries.) If utilized, the acidic calcium salts or acidic anion source(s), can be first dissolved in water by adding slowly with agitation; however it is preferred that they be part of the citric and malic acid solution. The remaining calcium sources can then be added to make a slurry. Adequate agitation must be used to keep the slurry in suspension particularly when using calcium hydroxide which tends to form a paste in corners and dead spots.

If utilized, the flavor component is another premix. If the flavor component contains citric or malic acids, as for example, a fruit juice or fruit juice concentrate would, the ratio of the citric to malic acid will preferably be adjusted to be the same as in the citric and malic acid premix. Additional citric or malic acid is added if necessary to achieve this ratio. Otherwise, calcium citrate or calcium malate can form during the processing step and precipitate. Once precipitated, they are difficult to redissolve.

To improve the stability of the calcium malate and especially the calcium citrate species, it is preferred to adjust the water to fructose (on a dry weight basis) weight ratio to range from about 1:1 to about 1:2. The addition of fructose reduces the water available for the formation of insoluble calcium salts such as $Ca_3Cit_2 \cdot 4H_2O$. Without added fructose, the compositions are typically stable for at least about one week, after which the highly soluble citrate species become the more insoluble $Ca_3Cit_2 \cdot 4H_2O$. Hence for stability for greater than about one week a weight ratio of fructose (on a dry weight basis) to water of from about 2:1 to about 1:2 is preferred. If a flavor component is used, stability can be improved by adjusting the weight ratio of citric acid to malic acid in the flavor component or solution containing the calcium, sugar and acids premixes such that they are equivalent before addition of the flavorant to the solution. Preferably, the weight ratio of citric acid to malic acid will range from about 20:80 to about 80:20 and more preferably about 26:74. In addition, stability can be improved by adjusting the weight ratio of fructose (on a dry weight basis) to water in the flavorant or solution containing the calcium, sugar and acids premixes such that they are equivalent before addition of the flavorant to the solution. Preferably, the water fructose (on a dry weight basis) weight ratio will range from about 5:1 to about 1:3, more preferably from about 2:1 to about 1:2 and most preferably about 1:1 to about 2:1.

One preferred mixing sequence is as follows:

The sugars and the acid solution are mixed with agitation to produce a uniform mixture. The addition sequence is not critical. The acids can be dissolved in the mix tank with water and the sugar solution pumped in, or the sugar solution can be put into the tank and the acid solution pumped in.

To this mixture is added the calcium slurry or dry calcium source. The addition is controlled so that the reaction mixture does not become too hot. The temperature should not exceed 120° F. (49° C.). Methods of keeping the temperature below 120° F. (49° C.) include using jacket cooling or recirculating the batch through a heat exchanger. The calcium source is neutralized by the citric and malic acids during this addition and excess acid is present. The temperature rises due to the heat of neutralization. When calcium carbonate is used, the neutralization produces carbon dioxide which can cause foaming. This can be controlled by the rate of addition of calcium carbonate.

Optionally, flavor is then added to the calcium, citric and malic acid sugar mixture. Any preservatives, gums, emulsifiers, vitamins, minerals vegetable oils, weighting oils, or other optional ingredients are added at this stage. These materials are added as a water solution or as liquids.

Another preferred mixing sequence is as follows:

The water and 30% of a High Fructose Corn Syrup (HFCS) is heated to 100° F. (38° C.). The acids are added to the solution and mixed with agitation until dissolved. High shear mixing, milling or dispersators can be used to provide sufficient mixing in low water systems. When an acidic calcium salt or calcium lactate is used, it is also dissolved in this solution.

The dry calcium source is dispersed in the remaining HFCS. When using calcium carbonate, the addition is controlled so that foaming caused by the neutralization product, carbon dioxide, is controlled. When calcium hydroxide is used, the neutralization process is an exothermic reaction. The addition is controlled so that reaction mixture does not exceed 120° F. (49° C.).

Method of Preparation of Low Water Systems When Using High Fructose Corn Syrup or Liquid Fructose.

When preparing samples with a very low water content, less than or equal to about 20%, it is necessary to use as much as 70% of the Liquid Fructose, and/or high fructose corn syrup (HFCS). This will provide the water necessary to dissolve the acids. The water and 70% of the Liquid Fructose and/or High Fructose Corn Syrup, is heated to 100° F. (38° C.). The acids are added to the solution and mixed with agitation until dissolved. Dissolving the acids in water is endothermic causing the temperature to drop. Thus, additional heat may be needed to dissolve the acids. Continued heating may be necessary to dissolve the acids. Care is taken so that the temperature does not exceed 120° F. (49° C.). When acidic calcium salts, e.g. calcium chloride are used, they are also dissolved in this solution.

The dry calcium source is dispersed in the remaining sugar syrup. Calcium hydroxide is not preferred for use as the sole calcium source in this method. It tends to react with the high fructose corn syrup to form a solid mass. The addition is controlled so that foaming caused by the neutralization product, carbon dioxide, is controlled. At this point the composition is very viscous. Continued heating may be necessary. The addition is controlled so that reaction does not exceed 120° F. (4° C.).

Methods of Preparation of Low Water Systems When Using Fructose or Crystal line Sugars.

When preparing samples very low in water content, less than or equal to about 20%, it is necessary to use heat. The water is heated to 100° F. (38° C.). The acids are added to the solution and mixed with agitation until dissolved. The sugar is then added. Continued heating may be necessary to dissolve the sugars. Care is taken so that temperature does not exceed 120° F. (49° C.). When calcium chloride is used, it is also dissolved in this solution.

To this mixture is added the dry calcium source. The addition is controlled so that foaming caused by the neutralization product, carbon dioxide is controlled. At this point the syrup is very viscous. Continued heating may be necessary. When calcium hydroxide is used, the neutralization process is an exothermic reaction therefore the amount of heating used can be reduced. The addition is controlled so that reaction mixture does not exceed 120° F.

The sweetener supplement compositions are generally shelf-stable due to their low water activity. However, the compositions can be pasteurized with a short time, high temperature treatment or otherwise sterilized as is conventional for products of this type.

Basically, this is a process for preparing a shelf-stable sweetener supplement composition, comprising the steps of:
 (1) preparing a mixture of a sugar solution and citric and malic acid in water;
 (2) adding a slurry of calcium salts in water, wherein any calcium citrate, calcium malate, acidic calcium salt and acidic anion source is first dissolved in water and then other calcium salts are added to make the slurry, said slurry being added with agitation and wherein the temperature is maintained below 120° F.;
 (3) Optionally, the following steps are appropriate: of adding to the mixture of (2) a flavor component dissolved in water, wherein the weight ratio of citric and malic acid in the flavor component is in the same ratio as the citric and malic acids in (1) and the weight ratio of fructose (on a dry weight basis) to water in the flavor component is in the same ratio as in (1); and
 (4) adding to the mixture of (3) any preservatives and optional ingredients in water.

EXAMPLES

The following are specific embodiments of sweetener supplement compositions and methods for making them. These examples are illustrative of the invention and are not intended to be limiting of it.

EXAMPLE I

A sweetener supplement composition of the present invention is prepared as follows:

| Ingredients | wt/wt. % |
|---|---|
| Water | 11.91 |
| Citric Acid | 1.02 |
| Malic Acid | 2.75 |
| HFCS 55[1] | 82.48 |
| $CaCl_2.2H_2O$ | 0.50 |
| $CaCO_3$ | 1.34 |
| | 100 |

[1]HFCS 55 is a high fructose corn syrup supplied by A. E. Staley having, about 77% solids and about 29% water wherein about 55% of the solids is fructose and about 22% of the solids is dextrose.

The citric and malic acids are dissolved in 50% of the water. The HFCS55 is added to the mixture. $CaCl_2.2H_2O$ is dissolved in the reserved portion of water. $CaCO_3$ is slurried in the water containing the $CaCl_2.2H_2O$ and is then poured into the solution containing the HFCS55 and acids, while mixing. At this point, foaming can occur. Mix until the solution becomes clear and gas has evolved.

The resulting composition has about 0.72% soluble calcium, by weight; a pH of 3.12 (measured as is); 67.3° Brix and a specific gravity of 1.5. The specific gravity is calculated as follows: Mass of given volume syrup divided by the mass of same volume of water. Per ounce, the sweetener supplement provides about 306 mg calcium. Further, the sweetener supplement composition is stable from calcium precipitation for from at least about 3 days at temperatures of at least about 85° F. (29° C.) and generally for about 130 days at temperatures of at least about 85° F. (29° C.).

EXAMPLE II

A sweetened cereal product using the sweetener supplement composition of EXAMPLE I is prepared as follows:
Ingredients
  Whole Corn Kernel s
  Sweetener Supplement of EXAMPLE I The hulls are removed from the whole corn kernels. The kernels undergo low moisture cooking until the kernels are soft and compressible. The sweetener of EXAMPLE I is pumped into the stream of kernels during the steam cooking process. The cooked kernels are milled to about 2 mm thickness. The kernels are then toasted to form brown/blistered flakes. 1 oz. of cereal provides approximately 45 mg calcium.

EXAMPLE III

A sweetener supplement composition of the present invention is prepared as follows:

| Ingredients | wt/wt. % |
| --- | --- |
| Water | 9.90 |
| Citric Acid | 4.60 |
| Malic Acid | 12.87 |
| Liquid Fructose[1] | 63.60 |
| $CaCl_2.2H_2O$ | 2.43 |
| $CaCO_3$ | 6.60 |
| | 100 |

[1]High Fructose Corn Syrup 99 (Liquid fructose) supplied by A. E. Staley, is 77% solids and 23% water wherein about 99% of the solids is fructose.

All the citric and malic acids are dissolved in 100% of the water and 30% of the liquid fructose. $CaCl_2.2H_2O$ is then dissolved in the mixture. $CaCO_3$ is slowly added to the solution containing the liquid fructose, acids and $CaCl_2.2H_2O$ while mixing. At this point, foaming can occur. Mix until solution becomes clear and gas has, evolved.

The resulting compositon has about 3.3% soluble calcium by weight; a pH of 2.7 (measured as is); 68.9° Brix and a specific gravity of 1.5. The specific gravity is calculated as mass of a given volume of syrup divided by mass of same volume of water. Per ounce the sweetener supplement provides about 1403 mg calcium. Further, the sweetener supplement composition is stable from calcium precipitation for at least about 3 days at temperatures of at least about 85° F. (29° C.) and generally for up to about 35 days at temperatures of at least about 85° F. (29° C.).

EXAMPLE IV

A sweetener supplement composition of the present invention is prepared as follows:

| Ingredients | wt/wt. % |
| --- | --- |
| Water | 19.82 |
| Citric Acid | 8.80 |
| Malic Acid | 23.70 |
| Liquid Fructose[1] | 31.73 |
| $CaCl_2.2H_2O$ | 4.29 |
| $CaCO_3$ | 11.66 |
| | 100 |

[1]High Fructose Corn Syrup 99 (Liquid fructose) supplied by A. E. Staley, is 77% solids and 23% water wherein about 99% of the solids is fructose.

The acids are dissolved in the water and 50% of the liquid fructose. $CaCl_2.2H_2O$ is dissolved in the solution containing the liquid fructose and acids. The calcium carbonate is dispersed/slurried in the remaining fructose and then added to the solution containing the acids, fructose and calcium chloride. At this point, foaming can occur. Mix until the solution becomes clear and gas has evolved.

The resulting composition has about 5.8% soluble calcium, by weight; a pH of 2.6 (measured as is); 71.82° Brix and a specific gravity of 1.44. The specific gravity is calculated as mass of a given volume of syrup divided by mass of same volume of water. Per ounce, the sweetener supplement provides about 2372 mg of calcium. Further, the sweetener supplement composition is stable from calcium precipitation for at least about 3 days at temperatures of at least about 85° F. (29° C.) and generally for about 7 days at temperatures of at least about 85° F. (29° C.).

EXAMPLE V

A sweetener supplement composition of the present invention is prepared as follows:

| Ingredients | wt/wt. % |
| --- | --- |
| Water | 52.67 |
| Citric Acid | 2.15 |
| Malic Acid | 3.82 |
| Liquid Fructose[1] | 38.64 |
| $CaCl_2.2H_2O$ | 0.72 |
| $CaCO_3$ | 2.00 |
| | 100 |

[1]High Fructose Corn Syrup 99 (Liquid fructose) supplied by A. E. Staley, is 77% solids and 23% water wherein about 99% of the solids is fructose.

The citric and malic acids are dissolved in 70% of water and 50% of the liquid fructose. $CaCl_2.2H_2O$ is dissolved in the remaining water. $CaCO_3$ is slowly added to the solution containing the $CaCl_2.2H_2O$. At this point, foaming can occur. Mix until the solution becomes clear and gas has evolved. Add remaining fructose.

The resulting composition has about 1.0% soluble calcium, by weight; a pH of 3.05 (measured as is); 71.82° Brix and a specific gravity of 1.4. The specific gravity is calculated as mass of a given volume of syrup divided by mass of same volume of water. Per ounce, the sweetener supplement provides about 397 mg of calcium. Further, the sweetener supplement composition is stable from calcium precipitation for at least about 3 days at temperatures of at least about 85° F. (29° C.) and generally for about 100 days at temperatures of at least about 85° F. (29° C.).

EXAMPLE VI

A citrus punch using the dry powder form of the present invention is prepared as follows:

| Ingredients | wt/wt. % |
| --- | --- |
| *Citrus Punch | 98.5 |
| Dry Powder Form of Sweetener I | 3.5 |
| | 100.0 |

*Florida Gold ® Citrus Punch is a commercially available punch.

A sweetener supplement composition of the present invention is prepared as follows:

SWEETENER I

| Ingredients | wt/wt. % |
|---|---|
| Water | 9.90 |
| Citric Acid | 4.60 |
| Malic Acid | 12.87 |
| Liquid Fructose | 63.60 |
| $CaCl_2.2H_2O$ | 2.43 |
| $CaCO_3$ | 6.60 |
| | 100 |

1. Liquid fructose supplied by A. E. Staley having 77% solids and 23% water wherein 99% of the solids is fructose.

The citric and malic acids are dissolved in 100% of the water and 30% of the liquid fructose. $CaCl_2.2H_2O$ is then dissolved in the mixture. $CaCO_3$ is slowly added to the solution containing the liquid fructose, acids and $CaCl_2.2H_2O$, while mixing. At this point, foaming can occur. Mix until solution becomes clear and gas has evolved.

The resulting solution is poured into stainless steel pans at a depth of about ¼" (1 cm). The solution is then frozen. After freezing, frozen pans are placed on shelves (below 0° C.) in a REPP (Research Equipment for Pilot & Production) freeze dryer, by Virtis Co., Inc. Manufacture instructions are then followed.

The resulting dry powder comprises about 4.36% calcium determined by Atomic Absorption.

To make a citrus punch:

The (ready to serve) citric punch is poured into a pitcher. To the citrus punch, the dry powder form of Sweetener I is added. The punch is stirred until the powder is dissolved.

The resulting punch has about 0.12% soluble calcium, by weight; a pH of 3.06 (measured as is); 13° Brix, a density of 1.35 calculated as specific gravity (volume of syrup/mass same volume of water, and a consumer acceptable taste. Per 8 oz. serving, the punch provides about 368 mg of calcium.

EXAMPLE VII

A citrus punch using the dry powder form of the present invention is prepared as follows:

| Ingredients | wt/wt. % |
|---|---|
| *Drink-Aid ® Strawberry Mix | 82.04 |
| Dry Powder Form of Sweetener B | 17.96 |
| | 100.0 |

*Drink-Aid ® Strawberry Mix is a commercially available powdered mix distributed by INTER-AMERICAN FOODS, INC. It contains no fruit juice.

SWEETENER II

A sweetener supplement composition of the present invention is prepared as follows:

| Ingredients | wt/wt. % |
|---|---|
| Water | 76.23 |
| Citric Acid | 5.20 |
| Malic Acid | 5.44 |
| Sucrose | 5.00 |
| $CaCO_3$ | 8.13 |
| | 100 |

To the water, citric and malic acids are added and stirred until dissolved. Sugar is then added. After the sugar is dissolved, calcium carbonate is added slowly to prevent the solution from overflowing (gas evolution). The solution is agitated until the reaction is complete. The solution is then poured into stainless steel pans and dried in a Blue M convection oven at 80° C.

The resulting powder comprises about 15.7% calcium as determined by Atomic Absorption.

To make a citrus punch:

The Drink-Aid ® Strawberry Mix is weighed into a weighing boat. To the powder, the dry powder form is added. Powders are stirred until uniform in appearance.

The resulting powder comprises about 2.7% calcium, by weight. A beverage prepared from the powder has about 0.6% soluble calcium, by weight; a pH of 3.8 (measured as is); 11.5° Brix, a density of 1.3 calculated as specific gravity (volume of syrup/mass same volume of water) and a consumer acceptable taste. Per eight ounce serving, the reconstituted drink provides about 230 mg of calcium.

What is claimed is:

1. A concentrated calcium citrate malate sweetener supplement composition consisting essentially of:
   (a) from about 1% to about 7%, by weight, soluble calcium;
   (b) from about 2% to about 47%, by weight, of an edible acid component comprising a mixture of citric acid and malic acid wherein the ratio of citric equivalents and malic equivalents to calcium is from about 1.5:1 to about 2:1 and the ratio of citric equivalents to malic equivalents is from about 3:97 to about 93:7;
   (c) from about 5% to about 80% sugar, on a dry weight basis, wherein at least 5% of said sugar is fructose and the ratio of said sugar to water is from about 5:1 to about 1:3; and
   (d) from about 5% to about 92%, by weight, water; and wherein said sweetener composition is clear and stable from calcium precipitation for at least about 4 hours at temperatures of at least about 85° F. (29° C.).

2. A sweetener supplement composition according to claim 1 wherein the ratio of citric equivalents and malic equivalents to calcium equivalents is from about 1.5:1 to about 1.8:1 and the ratio of citric equivalents to malic equivalents is from about 10:90 to about 50:50.

3. A sweetener supplement composition according to claim 2 wherein the ratio of citric equivalents to malic equivalents is about 20:80.

4. A sweetener supplement composition according to claim 2 wherein at least about 15% of said sugar is fructose and the weight ratio of water to fructose, on a dry weight basis, is from about 5:1 to about 1:3.

5. A sweetener supplement composition according to claim 4 wherein the weight ratio of water to fructose, on a dry weight basis, is from about 2:1 to about 1:2 and the compositions are stable from calcium precipitation for from at least about four hours to at least about three days at temperatures of at least about 85° F. (29° C.).

6. A sweetener supplement composition according to claim 5 further comprising from about 0.05% to about 5% of an acidic anion.

7. A sweetener supplement composition according to claim 1 in dry powder form, wherein 100 mg of said powder is from about 93% to about 100% soluble in 50 mls. of water.

8. A process for preparing a dry sweetener supplement composition according to claim 1 comprising the steps of:

(a) preparing a solution of high fructose corn syrup and water wherein 30% of the total amount of high fructose corn syrup is used;
(b) heating the solution of (a) to a temperature of about 100° F. (38° C.);
(c) adding citric and malic acids to the mixture of (b) with agitation until dissolved;
(d) dispersing a dry calcium source in the remaining high fructose corn syrup to form a slurry; and
(e) adding the slurry of (d) to the solution of (c) with agitation wherein the additon is maintained at a temperature below 120° F. (49° C.).

9. A process according to claim 8 wherein the sweetener supplement mixture of step (e) comprises from about 1% to about 7% soluble calcium; from about 2% to about 47% by weight acids comprising a mixture of citric acid and malic acid wherein the ratio of citric equivalents and malic equivalents to calcium equivalents is from about 1.5:1 to about 2:1 and the ratio of citric equivalents to malic equivalents is from about 3:97 to about 93:7; from about 5% to about 80% sugar, on a dry weight basis, and from about 5% to about 92% by weight, water and wherein this mixture is freeze-dried at a temperature below about 8° C.

10. A process according to claim 9 wherein the sweetener supplement is frozen in slabs having a thickness of from about 0.8 cm to about 1.1 cm prior to freeze drying.

11. A process according to claim 10 wherein the sweetener supplement is frozen in slabs having a thickness of from about 0.8 cm to about 1 cm prior to freeze drying.

12. A concentrated calcium citrate malate sweetener supplement composition consisting essentially of:
(a) from about 1.2% to about 2.5%, by weight, soluble calcium;
(b) from about 2% to about 17%, by weight, of an edible acid component comprising a mixture of citric acid and malic acid wherein the ratio of citric equivalents and malic equivalents to calcium is from about 1.15:1 to about 2:1 and the ratio of citric equivalents to malic equivalents is from about 3:97 to about 93:7;
(c) from about 5% to about 75% sugar, on a dry weight basis, wherein said sugar comprises at least about 5% fructose, on a dry weight basis; and
(d) from about 5% to about 92% water by weight, wherein said sweetener composition is clear and stable from calcium precipitation for at least about 3 days at temperatures of at least about 85° F. (29° C.).

13. A sweetener supplement composition according to claim 12 wherein the ratio of citric equivalents and malic equivalents to calcium equivalents is from about 1.5:1 to about 1.8:1 and the ratio of citric equivalents to malic equivalents is from about 10:90 to about 50:50.

14. A sweetener supplement composition according to claim 13 wherein the ratio of citric equivalents to malic equivalents is about 20:80.

15. A sweetener supplement composition according to claim 13 wherein at least about 40% by weight, of said sugar is fructose, the weight ratio of water to fructose on a dry weight basis, is from about 2:1 to about 1:2, and the compositions are stable from calcium precipitation for at least about seven days at temperatures of at least about 85° F. (20° C.).

16. A sweetener supplement composition according to claim 15 further comprising from about 0.05% to about 5% of an acidic anion.

17. A sweetener supplement composition according to claim 12 in dry powder form.

18. A concentrated calcium citrate malate sweetener supplement compositions consisting essentially of:
(a) from about 2.5% to about 7%, by weight, soluble calcium;
(b) from about 10% to about 47%, by weight, of an edible acid component comprising a mixture of citric acid and malic acid wherein the ratio of citric equivalents and malic equivalents to calcium equivalents is from about 1.5:1 to about 2:1 and the ratio of citric equivalents to malic equivalents is from about 3:97 to about 93:7;
(c) from about 10% to about 70% sugar, on a dry weight basis, wherein said sugar comprises at least about 15% by weight fructose, on a dry weight basis; and
(d) from about 20% to about 60% by weight water, wherein the weight ratio of water to fructose is from about 5:1 to about 1:2; and wherein said sweetener composition is clear and stable from calcium precipitation for at least about 3 days at temperatures of at least about 85° F. (29° C.).

19. A sweetener supplement composition according to claim 18 wherein the soluble calcium is sourced from the group consisting of calcium carbonate, calcium hydroxide and mixtures thereof.

20. A sweetener supplement composition according to claim 19 wherein the ratio of citric equivalents and malic equivalents to calcium equivalents is from about 1.5:1 to about 1.8:1 and the ratio of citric equivalents to malic equivalents is from about 10:90 to about 50:50.

21. A sweetener supplement composition according to claim 20 wherein the ratio of citric equivalents to malic equivalents is about 20:80.

22. A sweetener supplement composition according to claim 20 wherein the weight ratio of water to fructose, on a dry weight basis, is from about 2:1 to about 1:2.

23. A sweetener supplement composition according to claim 22 further comprising from about 0.05% to about 5% of an acidic anion selected from the group consisting of chloride anion, nitrate anion, sulfate anion and mixtures thereof.

24. A sweetener supplement composition according to claim 23, further comprising from about 0.2% to about 4%, of an acidic anion.

25. A sweetener supplement composition according to claim 18 in dry powder form wherein 100 mg of said powder is from about 93% to about 100% soluble in 50 mls. of water.

26. A concentrated calcium citrate malate sweetener supplement composition consisting essentially of:
(a) from about 2.5% to about 5%, by weight, soluble calcium;
(b) from about 15% to about 40%, by weight, of an edible citric equivalents and malic component comprising a mixture of citric acid and malic acid wherein the ratio of citric equivalents and malic equivalents to calcium equivalent is from about 1.5:1 to about 1.8:1 and the ratio of citric to malic equivalents acid is from about 3:97 to about 93:7;
(c) from about 25% to about 60% sugar, on a dry weight basis, wherein said sugar comprises at least about 40% fructose, on a dry weight basis; and
(d) from about 25% to about 60% by weight water, wherein the weight ratio of water to fructose is from about 2:1 to about 1:2; and wherein said sweetener composition is clear and stable from calcium precipitation for at least about 5 days at temperatures of at least about 85° F. (29° C.).

* * * * *